P. C. HEWITT.
ELECTRIC VAPOR APPARATUS AND METHOD OF OPERATING THE SAME.
APPLICATION FILED JAN. 11, 1906.
1,110,545.
Patented Sept. 15, 1914.
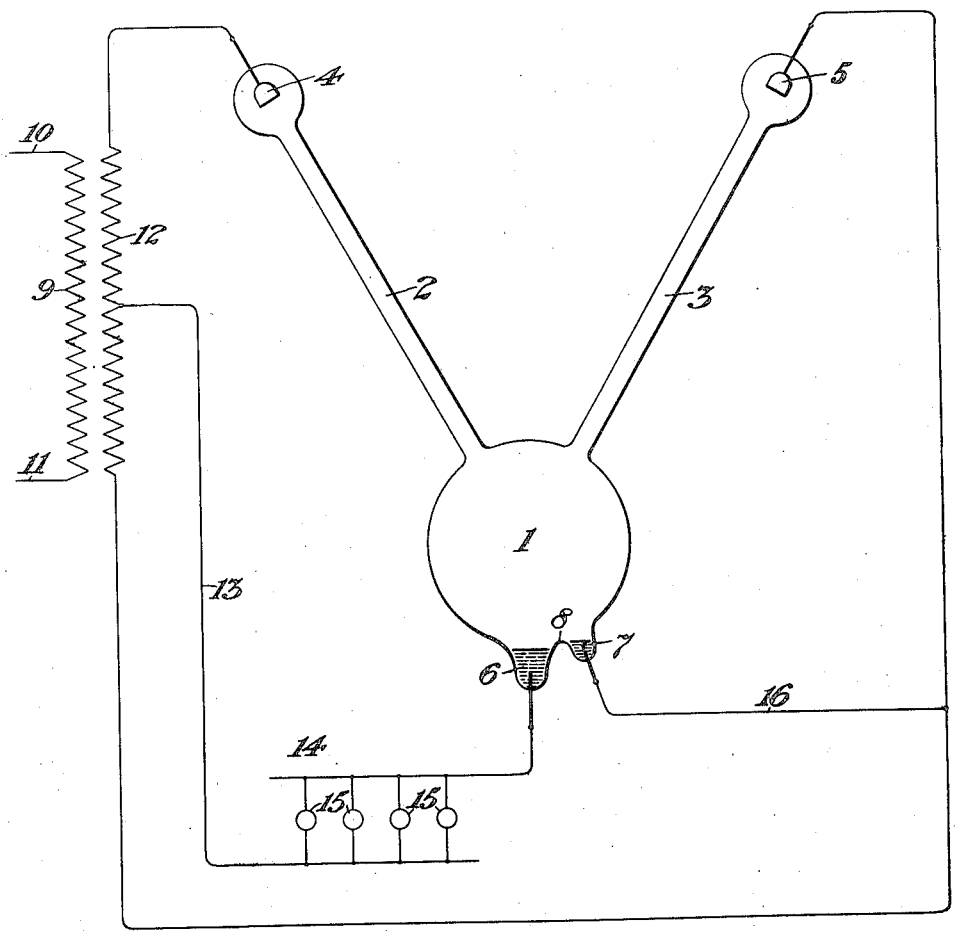

UNITED STATES PATENT OFFICE.

PETER COOPER HEWITT, OF NEW YORK, N. Y., ASSIGNOR, BY MESNE ASSIGNMENTS, TO COOPER HEWITT ELECTRIC CO., OF HOBOKEN, NEW JERSEY, A CORPORATION OF NEW JERSEY.

ELECTRIC VAPOR APPARATUS AND METHOD OF OPERATING THE SAME.

1,110,545.      Specification of Letters Patent.      Patented Sept. 15, 1914.

Application filed January 11, 1906. Serial No. 295,538.

*To all whom it may concern:*

Be it known that I, PETER COOPER HEWITT, a citizen of the United States, and resident of New York, county of New York, State of New York, have invented certain new and useful Improvements in Electric Vapor Apparatus and Methods of Operating the Same, of which the following is a specification.

The difference of the resistance to starting residing at an electrode in a vapor electric apparatus when the said electrode is positive, as compared with the resistance of the same electrode when negative, has been pointed out by me and in various United States applications I have shown and described means for utilizing this difference. Among other things, I have described the negative electrode resistance to starting at an acting negative electrode prior to the passage of a definite quantity of current, and the resistance residing at the same electrode after a certain definite quantity of current has begun to pass. I have designed various devices for the utilization of these phenomena in the arts; such, for example, as the well-known device for obtaining direct current from an alternating current source through utilizing the negative electrode resistance to starting residing at an active positive electrode on a change of sign at such electrode. In other words, the quality residing in an electrode temporarily or normally acting as a negative electrode has been turned to a useful purpose, instead of being made to serve merely as an obstacle to the passage of current.

I have found that a kindred phenomenon resides in the vapor between the positive and negative electrodes of a vapor electric apparatus, or in the space intervening between any two electrodes. That is to say, there is a resistance to starting or a reluctance impeding the passage of current residing in the vapor or the space intervening between two electrodes in a vapor apparatus.

The object of the present invention is to utilize this resistance or reluctance for the purpose of preventing short-circuiting between the normal positive electrodes of such an apparatus. So far as I know, no previous attempt has been made to render this resistance or reluctance useful for the purpose indicated. It is practicable, however, to utilize this phenomenon to prevent undesirable short-circuiting in the vapor apparatus and the object of the present invention is to provide the necessary conditions under which the vapor column or the space intervening between positive electrodes may be utilized to prevent injurious short-circuiting.

Up to about six (6) inches or some other critical distance, the vapor or the space intervening between positive electrodes apparently presents only a slight resistance to starting, but this resistance becomes considerable when the critical distance is multiplied by two or more and at forty-eight (48) inches the vapor column may possess a resistance to starting requiring a pressure of several thousand volts to start current flowing.

The resistance to starting of the vapor column or space intervening between electrodes increases when the distance between electrodes is increased, but in a far greater ratio. Another characteristic of this resistance is that it increases with the density of the intervening gas or vapor, whereas the negative electrode resistance to starting residing at any negative electrode, which resistance is at present utilized in preventing short-circuiting between electrodes in vapor converters, decreases with the increase of density of the intervening gas or vapor.

Taking as a type a vapor converter having two positive electrodes and a common negative electrode, and assuming that the object at present in contemplation is that of preventing short-circuiting between positive electrodes, I may say that the present invention contemplates an apparatus in which the positive electrodes are located so far apart or that the path between them shall be such as to prevent any probability under ordinary or extraordinary conditions of operation of a discharge between the positive electrodes causing a destructive or injurious short-circuiting. It is, of course, understood that the length, diameter, density and characteristics of the vapor column from one positive electrode to the other are the factors which determine the voltage required to cause a short-circuit, and this length and other characteristics may be so adjusted as to provide against all ordinary probabilities of short-circuiting. It is possible by adjusting this length or the distance between the positive electrodes to give to the vapor column between the positive electrodes a predetermined value as to the voltage required to break down the resistance of the vapor column.

Such is the broad conception of the invention disclosed herein. Incidentally, I show a common negative electrode herein as being located substantially half way between the two positive electrodes, by which arrangement the passage of current between either positive electrode and the common negative electrode may be made to bear a definite relation as to the starting voltage required to the voltage required for starting a passage of current between the two positive electrodes. In this application, however, the relative location of the negative electrode is not necessarily taken into account, the object being broadly to provide such a relation between the positive electrodes as to obviate the danger of short-circuiting. Considering the disclosure herein, however, in a narrower sense, the distance between the two positive electrodes being practically twice that from either positive electrode to the common negative electrode, the voltage required to cause a short-circuit between the two positive electrodes will be more than twice as great and may be more than four times as great as that required for starting a current from either positive electrode to the common negative electrode; and it seems probable that this ratio will more nearly approximate the cube of the relative distances rather than the square thereof, so that under certain conditions the breaking down resistance of the vapor column as between the two positive electrodes will be approximately eight times the breaking-down resistance between either positive electrode and the common negative electrode. This statement refers to the initial starting resistance of the vapor column itself. To this should be added the normal negative electrode resistance of the positive electrode which is for the moment a negative with relation to the other positive electrode.

It will be understood that the structure containing two positive electrodes and a common negative electrode is simply taken as a type and that the same inventive idea is easily applicable to vapor converters or other vapor apparatus containing more than two positive electrodes. It is also clear that the same principle of operation applies to other forms of vapor apparatus besides vapor converters.

It should further be understood that so far as the broad idea of the present invention is concerned, the positive electrode need not be symmetrically placed with relation to the negative electrode, such broad idea being based upon the absolute separation of the positive electrodes from each other without regard to the relative proportions of the different parts of the apparatus.

I have illustrated my invention in the accompanying drawing which is an elevation of a vapor device suited for the carrying out of my invention together with a diagram of appropriate circuits connected therewith.

In the drawings, 1 is the container of a mercury vapor converter, and 2 and 3 are extensions thereof which may be assumed to be of considerable length, say, forty-eight (48) inches. Near the outer end of each extension is an electrode, one being shown at 4, and another at 5. At the bottom of the container 1 is a main negative electrode, 6, common to the two positive electrodes 4 and 5 and in a separate pocket in the said container may be a supplemental positive electrode, 7, separated from the main electrode 6 by an intervening ridge or bridge, 8. The electrodes 6 and 7 are usually of some conducting liquid such as mercury and the starting of the apparatus is brought about in a manner now well-known, by tipping or tilting the apparatus so as to first bring the electrodes 6 and 7 into contact and afterward to separate said electrodes so as to provide a local flow of current between these electrodes which local flow is afterward transferred to the main electrodes through the intervening gas or vapor. Any other convenient starting means may be employed in place of those described. This auxiliary starting electrode may be of any character and may or not be used as desired for in many cases it is not necessary.

At 9 I show the primary of a transformer, the same being connected by conductors, 10 and 11, to a suitable alternating current generator or source of supply (not shown). The secondary, 12, of the said transformer has its terminals connected to the respective positive electrodes 4 and 5 and an intermediate point of the secondary is joined by a conductor, 13, to the main negative electrode 6 through a work circuit, 14, containing translating devices, 15, 15.

The supplemental positive electrode 7 is joined by a conductor, 16, to the positive side of the circuit, as shown.

The apparatus having been started in to operation in the manner above described or in any other suitable manner, current will flow in a uniform direction through the apparatus and through the work circuit 14. By varying the length of the extensions 2 and 3 the apparatus may be adapted for different voltages while any increase in the length of these extensions will greatly increase the starting resistance of the vapor path should there be any tendency for either of the positive electrodes 4 or 5 temporarily to become a negative. To the starting resistance of the vapor column, as already mentioned, is added the natural negative electrode resistance residing at each of the positive electrodes, when such electrodes becomes negative.

I claim as my invention:—

1. A rectifier for alternating current including an exhausted container having anode chambers, an anode at the remote end of each chamber and a cathode, the distance between any two anodes by way of any possible current path greatly exceeding that between either anode and the cathode.

2. A rectifier for alternating currents including a hermetically sealed exhausted container having long and narrow spreading upwardly extending tubular portions, and a vaporizable cathode in the said container, together with solid anodes at the remote ends of the said tubular portions adapted for connection to the terminals of an alternating current source whereby the starting resistance of the said tubular portions is added to the negative electrodes starting reluctance of the anodes.

Signed at New York, in the county of New York, and State of New York, this eighth day of January A. D. 1906.

PETER COOPER HEWITT.

Witnesses:
   WM. H. CAPEL,
   THOS. H. BROWN.